June 19, 1962 C. W. NEWELL 3,040,126
BLANKING CIRCUIT
Filed Aug. 4, 1959
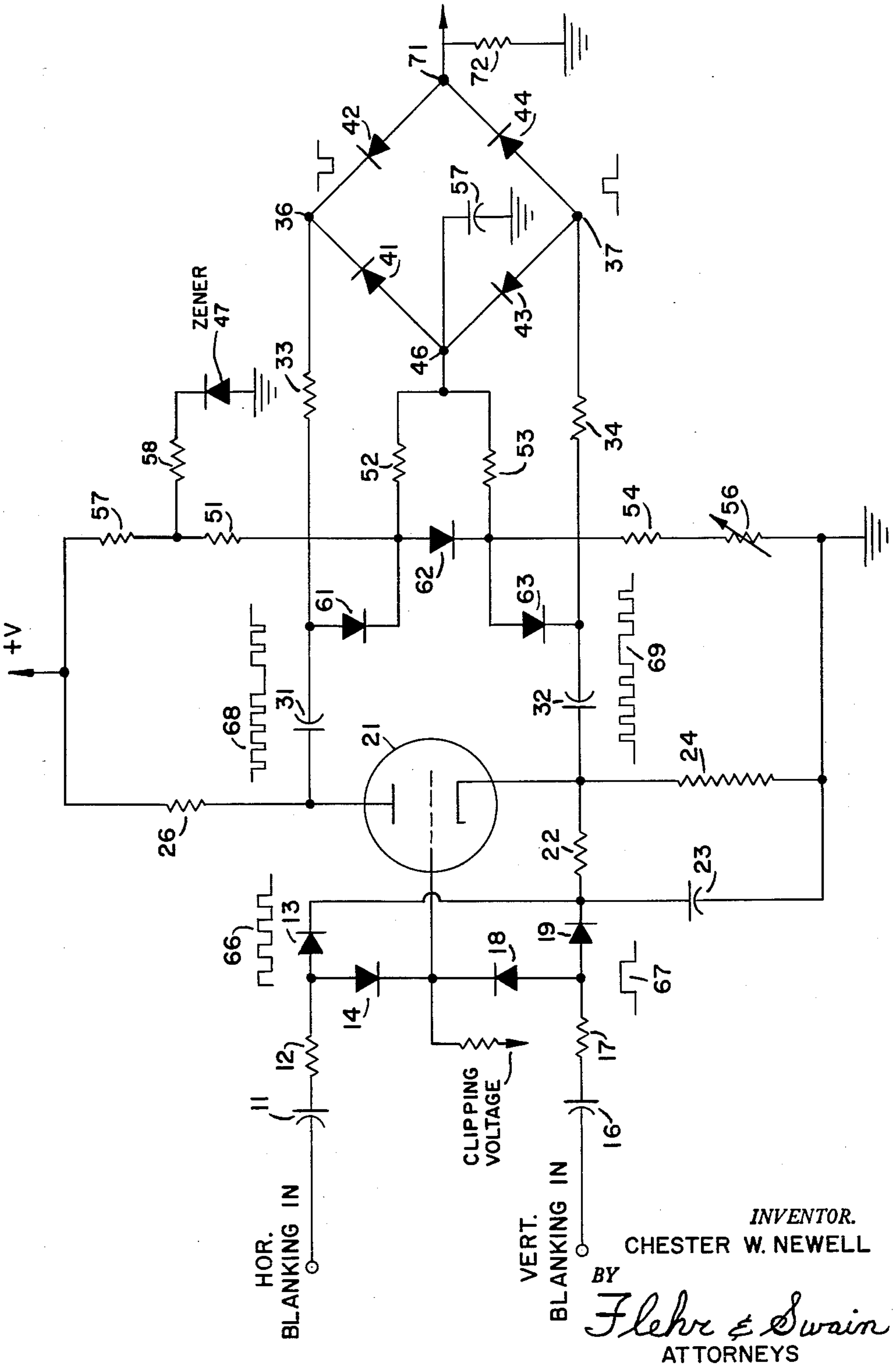
*INVENTOR.*
CHESTER W. NEWELL
*BY* Flehr & Swain
ATTORNEYS 3,040,126
Patented June 19, 1962

3,040,126
BLANKING CIRCUIT

Chester W. Newell, Sunnyvale, Calif., assignor to Ampex Corporation, Redwood City, Calif., a corporation of California Filed Aug. 4, 1959, Ser. No. 831,542
2 Claims. (Cl. 178—7.2)

This invention relates generally to a circuit for blanking a television signal.

In the blanking circuits of the prior art, blanking pulses having amplitude somewhat greater than the video signals themselves are added to the video signal. Clipping circuits are then employed for trimming off the excess signal to achieve the desired blanking level. Thus, the clipping removes noise spikes which ride on the blanking pulse giving a blanking interval which is noise-free. Synchronizing pulses are then added. By critical adjustment of the clipping level, it is possible to make the blanking level somewhat lower than the true black level of the picture.

The clipping is usually done by non-linear circuits and some non-linearity may be introduced. Clamping is employed to restore the D.-C. components of the signal. The pedestal height is controlled by biasing to the clamping means.

It is an object of the present invention to provide an improved blanking circuit.

It is another object of the present invention to provide a blanking circuit suitable for positive or negative blanking in any region of the video signal.

It is another object of the present invention to provide a blanking circuit for forming a pedestal in any region within or without the video signal.

It is another object of the present invention to provide a blanking circuit which is adapted to mix separate vertical and horizontal blanking pulses for composite blanking.

It is a further object of the present invention to provide a blanking circuit which introduces negligible nonlinearities since the diodes employed are biased well away from the video signal and keyed only during blanking intervals.

It is a further object of the present invention to provide a blanking circuit in which the pedestal height is independent of supply voltage variations and can be adjusted from a remote location by applying a D.-C. voltage.

These and other objects of the invention will become more clearly apparent from the following description when taken in conjunction with the accompanying drawing.

Referring to the single drawing, the horizontal blanking signals are capacitively coupled 11 through a resistor 12 to the clipping diodes 13 and 14. The vertical blanking pulses are capacitively coupled through resistor 17 to the clipping diodes 18 and 19. The diodes 14 and 18 are connected to the grid of the tube 21 connected in a phase splitter network as will be presently described. The output from the diodes 13 and 19 is resistively connected through the resistor 22 to the cathode of the tube 21. Suitable bypass capacitor 23 and bias resistor 24 are associated with the cathode circuit of the tube. The plate circuit is resistively connected by resistor 26 to a +V supply voltage. Output signals are capacitively coupled from the plate and cathode by the capacitors 31 and 32, respectively. The signals are resistively connected by the resistors 33 and 34 to the opposite terminals 36 and 37 of a bridge circuit which includes oppositely poled diodes 41—44.

A suitable constant voltage is applied to the terminal 46 of the bridge circuit. The voltage is derived from a constant voltage means, for example, a Zener diode 47 connected in shunt with a network including the serially connected resistors 51—54 and the series variable resistor 56. The common terminal of the resistors 52 and 53 is connected to the bridge terminal 46 to deliver a portion of the voltage applied across the resistive circuit. The terminal 46 is capacitively coupled 57 to ground. The voltage applied to terminal 46 may be adjusted by varying the variable resistor 56. A current limiting resistor 58 is connected to limit the current through the Zener diode 47. Diodes 61 and 63 are D.-C. restorers which establish a D.-C. reference for waveforms 68 and 69 respectively. Diode 62 is a voltage regulating diode (Zener or stabistor type) which establishes a bias across the bridge at terminals 36 and 37 in order to prevent conduction of diodes 42 and 44 if a video signal (not shown) is impressed on terminal 71. It is to be noted that any video signal applied to terminal 71 (i.e. across resistor 72) should have a pedestal level which is clamped to a desired reference voltage in order to add the new blanking signal to a video signal having a predetermined pedestal level.

Operation of the circuit is as follows. Horizontal blanking pulses of the form shown at 66 are applied to one terminal, while vertical blanking pulses of the type shown at 67 are applied to the other terminal. The pulses are clipped, mixed and applied to the phase inverter including the tube 21. Thus, the output signals will be signals of the type shown at 68 and 69 having 180° phase relationship. These signals are applied to the opposite terminals 36 and 37 of the bridge circuit and serve to apply a voltage across the bridge terminals which causes the diodes 41—44 to conduct. The forward impedance is reduced, effectively connecting the terminal 71 to the terminal 46 whereby the voltage at the terminal 71 is determined almost entirely by the voltage at the terminal 46. The output terminal 71 is connected to load resistor 72. When horizontal or vertical blanking signals are applied, the video signal is effectively shorted out and the signal will be a voltage corresponding to the voltage at the terminal 46. Thus, the video is clamped to the voltage at the terminal 37 through the same path for both vertical and horizontal blanking pulses. The blanking pedestal height is controlled by controlling the voltage at the terminal 46.

A circuit in accordance with the foregoing was constructed in which the various components had the following values:

| | |
|---|---|
| Voltage: | |
| +V ---------- volts | 250 |
| Tube: | |
| 21 | 5687 |
| Diodes: | |
| 13 | DR498 |
| 14 | DR498 |
| 18 | DR498 |
| 19 | DR498 |
| 36 | Z180 |
| 41 | DR498 |
| 42 | DR498 |
| 43 | DR498 |
| 44 | DR498 |
| 61 | DR498 |
| 62 | SV22 |
| 63 | DR498 |

Resistors (ohms):

| | |
|---|---|
| 12 | 10K |
| 17 | 10K |
| 22 | 10K |
| 24 | 1.5K |
| 26 | 1.5K |
| 33 | 92 |
| 34 | 92 |
| 51 | 27K |
| 52 | 470 |
| 53 | 470 |
| 54 | 560 |
| 56 | 100 |
| 72 | 1K |
| 73 | 390K |

Capacitors (microfarads):

| | |
|---|---|
| 11 | 0.1 |
| 16 | 100 |
| 23 | 10 |
| 31 | 100 |
| 32 | 100 |
| 57 | 100 |

A circuit in accordance with the foregoing was constructed and successfully operated. Noise-free blanking pulses having an adjustable pedestal were provided. It is to be noted that the voltage of the pedestal is dependent upon the clamping potential at terminal 71 and the value of resistors 54 and 56.

I claim:

1. A blanking circuit for blanking a television signal in response to vertical and horizontal blanking pulses comprising separate means for receiving horizontal and vertical blanking pulses, each of the separate means including clipping means for establishing a predetermined potential level for the respective pulses, a phase splitter coupled to the clipping means for developing two composite blanking signals having 180° phase relationship, first and second pairs of series-connected diodes interconnected in closed circuit arrangement with the diodes of each pair being oppositely poled, the two signals being coupled to respective junctions of the diodes of the first and second pairs of diodes, means for applying a reference potential between the common junctions of the pairs of diodes through a load having an impressed television signal to be blanked.

2. A blanking circuit as in claim 1 wherein said phase splitter comprises an element having at least three terminals and wherein said clipped horizontal and vertical blanking signals are applied to one of said terminals, and the signals having 180° phase relationship are obtained from the other two terminals of the element.

References Cited in the file of this patent

UNITED STATES PATENTS

| | | |
|---|---|---|
| 2,145,332 | Bedford | Jan. 31, 1939 |
| 2,658,104 | Smith | Nov. 3, 1953 |

FOREIGN PATENTS

| | | |
|---|---|---|
| 1,098,060 | France | July 18, 1955 |
| 764,142 | Great Britain | Dec. 19, 1956 |

OTHER REFERENCES

Publication: Television, 2nd edition, Zworykin and Morton, section 13.18, pages 532–536.